US012761349B2

(12) United States Patent
Barnes

(10) Patent No.: US 12,761,349 B2
(45) Date of Patent: Oct. 13, 2026

(54) COUNTER-BIRD AIRCRAFT SYSTEM USING A DOPPLER DETECTION DEVICE TO ALERT PILOTS OF AN IMMINENT BIRD STRIKE THREAT

(71) Applicant: William J. Barnes, Homestead, FL (US)

(72) Inventor: William J. Barnes, Homestead, FL (US)

( * ) Notice: Subject to any disclaimer, the term of this patent is extended or adjusted under 35 U.S.C. 154(b) by 0 days.

(21) Appl. No.: 18/780,082

(22) Filed: Jul. 22, 2024

(65) Prior Publication Data

US 2026/0023174 A1 Jan. 22, 2026

(51) Int. Cl.

| | |
|---|---|
| ***G01S 13/933*** | (2020.01) |
| ***A01M 29/10*** | (2011.01) |
| ***B64D 45/00*** | (2006.01) |
| ***B64D 47/04*** | (2006.01) |
| ***G01S 13/88*** | (2006.01) |

(52) U.S. Cl.

CPC ........... *G01S 13/933* (2020.01); *A01M 29/10* (2013.01); *B64D 45/00* (2013.01); *B64D 47/04* (2013.01); *G01S 13/886* (2013.01); *B64D 2045/0095* (2013.01)

(58) Field of Classification Search

CPC .... G01S 13/933; G01S 13/886; A01M 29/10; B64D 45/00; B64D 47/04; B64D 2045/0095

See application file for complete search history.

(56) References Cited

U.S. PATENT DOCUMENTS

| | | | | |
|---|---|---|---|---|
| 10,351,258 | B1 * | 7/2019 | Barnes | G01V 8/20 |
| 2005/0162262 | A1 * | 7/2005 | Dowdy | G08G 1/166 340/576 |
| 2016/0247406 | A1 * | 8/2016 | Khatwa | G05D 1/0833 |
| 2016/0282131 | A1 * | 9/2016 | Palfreyman | G01S 13/426 |
| 2018/0351634 | A1 * | 12/2018 | Ryan | H04N 7/185 |
| 2021/0206510 | A1 * | 7/2021 | Kimsey-Lin | B64D 47/06 |

* cited by examiner

*Primary Examiner* — Nazra Nur Waheed

(74) *Attorney, Agent, or Firm* — The Rapacke Law Group, P.A.; Andrew S. Rapacke; Kenneth F. Brooks

(57) ABSTRACT

A counter-bird aircraft system is disclosed, including a Doppler detection device having at least one emitter positioned on an aircraft, the emitter to emit a beam ahead of the aircraft. At least one receiver detects a return signal caused by the presence of a threat to the aircraft. A microprocessor processes the reception of the return signal and transmits an alert to an alert system which notifies the pilot of the presence of the threat.

12 Claims, 3 Drawing Sheets

COUNTER-BIRD AIRCRAFT SYSTEM USING A DOPPLER DETECTION DEVICE TO ALERT PILOTS OF AN IMMINENT BIRD STRIKE THREAT

TECHNICAL FIELD

The embodiments disclosed herein generally relate to systems for preventing or at least significantly reducing the possibility of bird strikes with a helicopter or aircraft using a Doppler detection device.

BACKGROUND

During flight, helicopters are susceptible to damage from the impact of birds into the cockpit through the windscreen, bird impacts with the rotor, or ingestion of birds into the engine intakes. These impacts may disable the pilot or flight controls, damage the rotor, or damage the engine; any of which may result in the loss of the aircraft. The collision risk for helicopters is very high because the majority of their flight operations are at low altitude where the bird strike risk is greatest. In addition, FAA data shows that the majority of helicopter bird strikes occur at night when the crew has no opportunity to visually detect and avoid birds ahead of the aircraft. Accordingly, it has been recognized that bird strikes with aircraft are a significant threat to flight safety and may cause significant, costly damage or loss of life.

Pulsed Doppler radars have been used on fighter aircraft for years to effectively detect other aircraft, but variants of these types of radar are unsuitable for helicopters because of their complexity, weight, power requirements, and cost. Smaller Doppler detection devices have been used in police radar guns for years, and have recently been modified to detect objects as small as baseballs to determine the speed of a pitch. These systems emit a continuous beam of RF energy at a fixed frequency in K band toward known targets. The frequency of the returning signal can then be processed to determine the speed of the target which is then presented to the user on a display. The devices in this effort will use the presence of a reflected Doppler signal (from birds, drones, or other obstructions) to warn pilots that "something" is ahead of the aircraft and that the threat of collision is imminent.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provided herein relate to a counter-bird aircraft-mounted system, including a Doppler detection device specifically designed to detect birds and alert pilots of an imminent bird strike threat. The counter-bird aircraft system includes a Doppler detection device having at least one emitter positioned on an aircraft, the emitter to emit a beam ahead of the aircraft. At least one receiver detects a return signal caused by the presence of a threat to the aircraft. A microprocessor processes the reception of the return signal and transmits an alert to an alert system which notifies the pilot of the presence of the threat.

The system provides a means for detecting an imminent threat to a helicopter or fixed-wing aircraft during flight, including take-off, landing, and low-altitude flight operations. The system may operate in high visibility conditions, daytime conditions, as well as low-visibility and nighttime conditions to aid in providing a warning to the pilot of the aircraft when an imminent threat is detected.

The system emits a continuous beam of RF energy toward the airspace in front of the aircraft where there should be nothing to return the signal to the Doppler detection device. In such, the embodiments provided herein serve the purpose of alerting for hazards in the flight path of the aircraft. During normal flight conditions, no return signal is received, and the system continues to emit the RF signal to continuously test for the presence of a threat in front of the aircraft. When dangerous birds, drones, or other obstructions are found in front of the aircraft, a Doppler signal is returned and detected by the system and the pilot is alerted by a visible and aural warning that continues as long as the threat remains in the emitted RF beam. There is intentionally no speed or range information, no display except for a warning, and no information about the target type, so that nothing is presented to distract a pilot from her normal mission activities. When a threat is detected and a conflict alert is sounding, all the pilot should do is perform a slight turn in either direction to take the target out of the RF beam, thereby breaking the collision geometry, and allowing the system to return to its normal alert status. The concept is similar to the warning systems on the rear bumper of a car that only sounds an alert when a collision is imminent.

In one aspect, the at least one emitter, using at least one receiver is positioned on a front portion of the aircraft to emit the beam in the forward direction corresponding to the direction the aircraft is moving.

In one aspect, the alert system includes at least one speaker or interface to the intercom system to emit an audible tone within the cockpit of the aircraft.

In one aspect, the at least one speaker or intercom interface emits a recorded voice message within the cockpit of the aircraft.

In one aspect, the alert system includes one or more lights positioned in the cockpit of the aircraft, the one or more lights to function as a visible alert.

In one aspect, the one or more counter-bird lights are positioned on the exterior of the aircraft. The Doppler detection device alert warning to the pilot is configured to activate the exterior counter-bird lighting.

In one aspect, a computer system is in communication with the Doppler detection system to receive the return signal received by the receiver and to process the return signal to determine if the return signal signifies an imminent threat to the aircraft.

In one aspect, the microprocessor is in operable communication with the computer system, wherein the microprocessor is used to estimate the distance between the aircraft and the threat based on the magnitude of the reflected signal and provide a corresponding alert system which varies in intensity based on these parameters.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
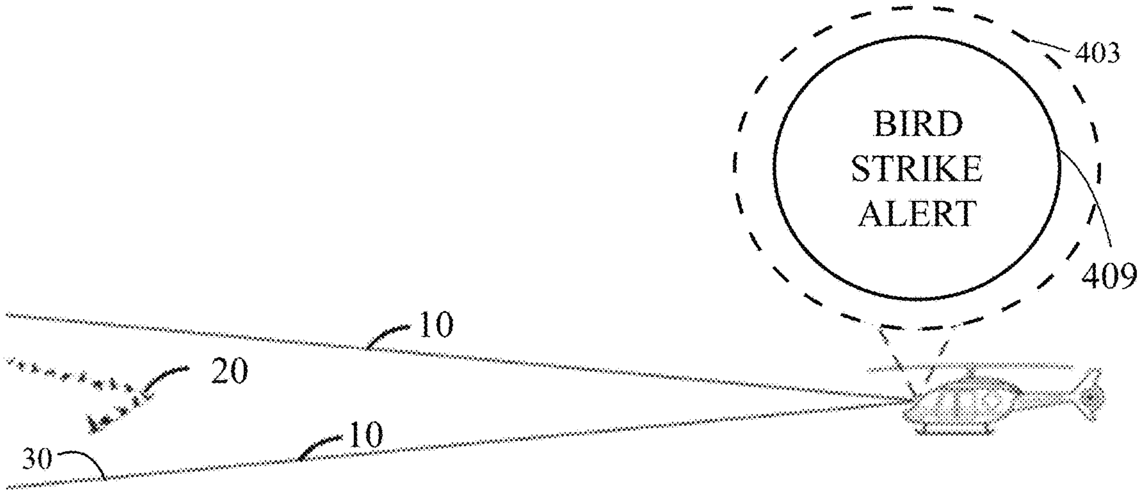
FIG. 1 illustrates a side view of an aircraft (or rotorcraft) employing the Doppler detection system to detect an imminent bird strike threat, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a counter-bird aircraft system which includes a Doppler detection device. A Doppler detection device is mounted to the aircraft and is in communication with a transmitter and receiver. The Doppler detection device is capable of detecting the presence of birds and treating any returned signal in the beam as an imminent threat to the aircraft. The Doppler detection system is useful in all light conditions, including daytime (i.e., high light) conditions, low light nighttime conditions and in clouds.

As used herein, the term "aircraft" may be used to describe fixed wing aircraft and/or rotorcraft (i.e., a helicopter). The example of a rotorcraft will be used herein for exemplary purposes. The system described herein is applicable to military, commercial, business, and general aviation aircraft, helicopters, UAV aircraft, and the emerging EVTOL craft.

The Doppler detection device emits a fixed beam from an emitter to detect the presence of an object (e.g., a bird or flock of birds). The transmitter and receiver array is mounted at the front of the aircraft (exterior or interior) and the emitter emits a continuous beam of radio-frequency (RF) energy in the X, Ka, or K band (or any other suitable RF) in a fixed pattern, directly in front of the aircraft (see FIG. 1 and FIG. 2). The continuous beam can be configured to be emitted in any shape but may be circular with a fixed radius, according to one example. One skilled in the arts will readily understand that the shape and pattern may be modified to best suit the aircraft and environment.

In another example, the shape of the beam being emitted may be square or rectangular with the long axis in the vertical orientation to account for variations in aircraft pitch and for bird species that are above the aircraft at its current altitude who may dive (as is typical for some species) to evade a perceived threat.

Once a Doppler return signal is detected by the receiver (s), an audible tone, voice message, and/or other alert signal (e.g., warning lights) are emitted such that the pilot is alerted to the threat. The audible tone, voice message, and/or other alert signal may be collectively referred to herein as an "alert" or "notification". It is to be understood that any combination of the audible tone, voice message, or similar alert signal may be implemented in the aircraft cockpit to sufficiently alert the pilot. The alert will be transmitted until the return signal is no longer detected by the receiver(s), and therefore, the threat is no longer imminent.

Figure 3:
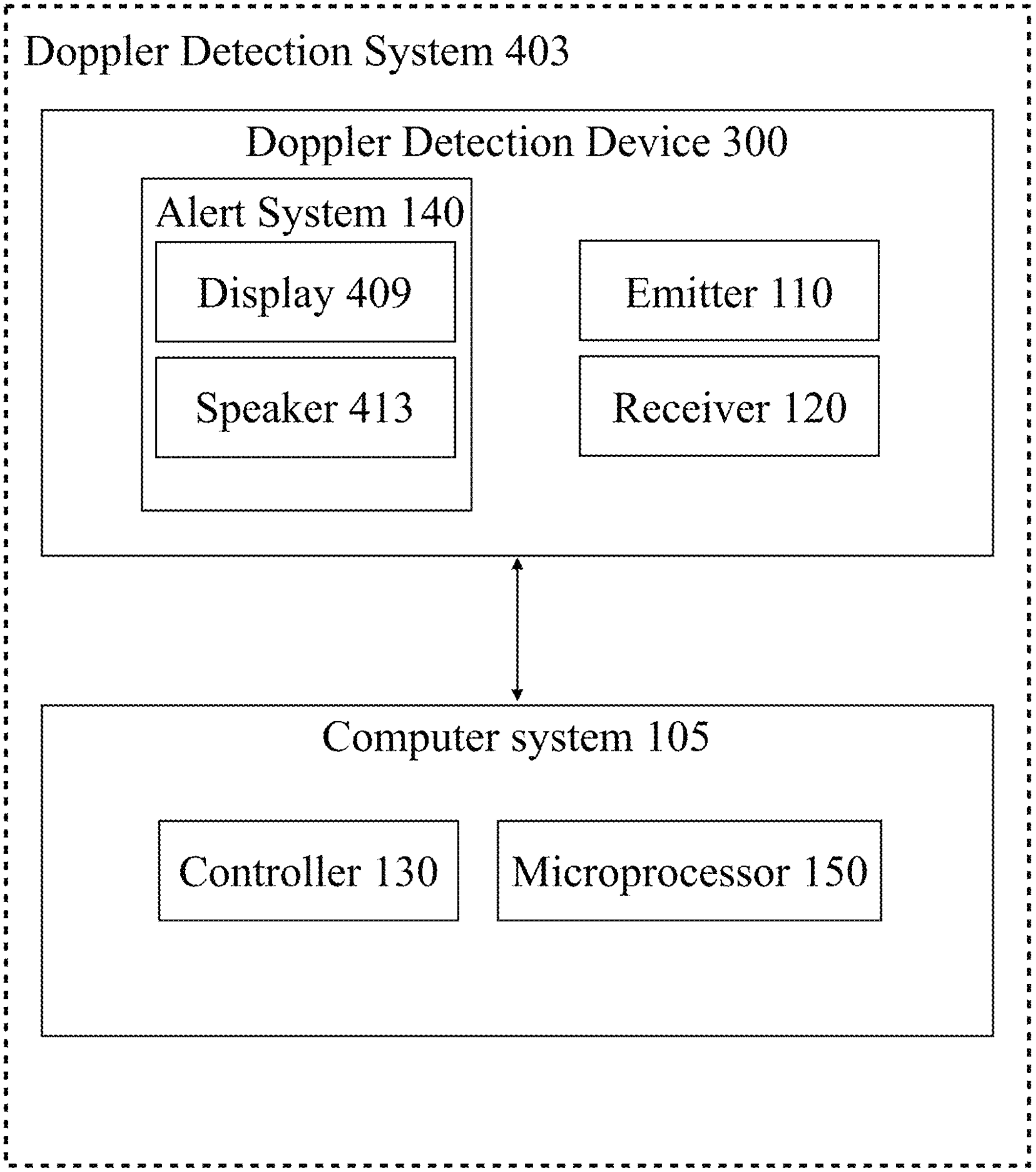
FIG. 3 illustrates a block diagram of the Doppler detection system and computer system utilized to detect, analyze, and transmit an alert associated with a threat, according to some embodiments.

FIG. 3 illustrates a block diagram of the of the Doppler detection system 403 and computer system 105 utilized to detect, analyze, and transmit an alert associated with a threat. The Doppler detection system 403 includes a Doppler detection device 300 comprising an emitter 110, receiver 120, and controller 130. The alert system 140 includes the display 409, and speaker(s) 413 which are configured to emit an audible and/or visual alert upon the detection of a threat. The computer system 105 includes a microprocessor 150 to process a signal received from the Doppler detection device to determine if the threat is imminent, the distance between the aircraft and the threat, among other variables. The microprocessor 150 may be configured to increase and/or decrease the intensity of the alert (i.e., the audible tone emitted from the speaker 413 and/or frequency/intensity of the visual alert emitted from the display 409).

Figure 2:
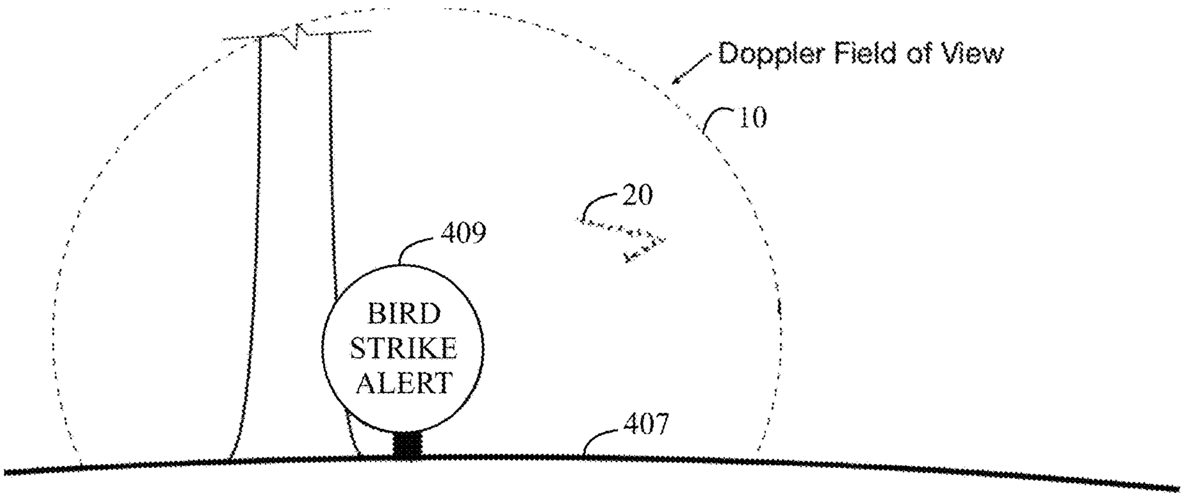
FIG. 2 illustrates a view looking ahead from the cockpit showing threat birds at a distance ahead within the beam of the Doppler emitter and the corresponding alert warning on the back of the device according to some embodiments.

In further reference FIGS. 1-3, a beam 10 emitted from the emitter 110. If a threat 20 is detected, the receiver 120 will receive a return signal. Once a return signal is received, the computer system 105 analyzes the return signal and transmits an alert signal, via alert system 140 to the speaker (s) 413 and/or display 409. An alert will be presented as long as a threat 20 is detected within the emitter beam 10.

Figure 4:
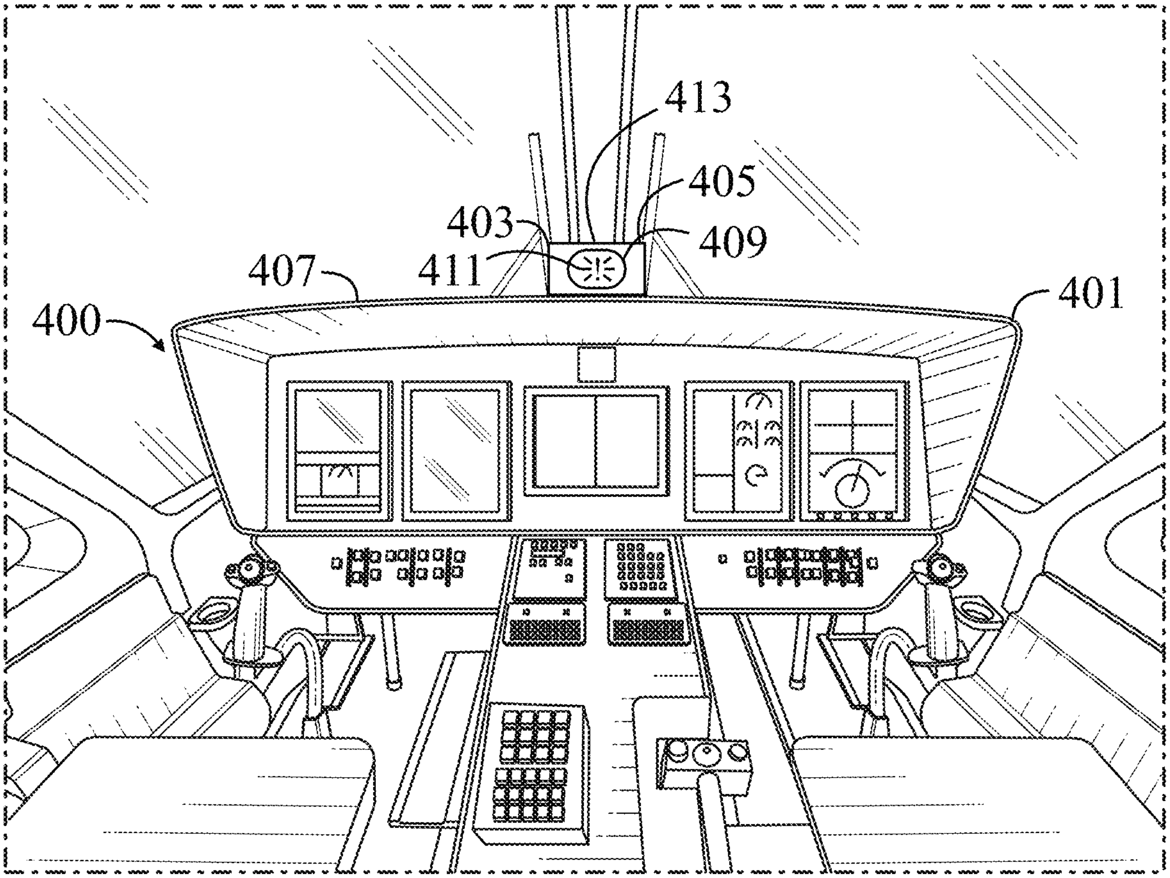
FIG. 4 illustrates a perspective view the cockpit of an aircraft wherein the Doppler detection system is mounted therein, according to some embodiments.

FIG. 4 illustrates a perspective view of the cockpit 400 of an aircraft 401 wherein the Doppler detection system 403 is mounted therein. The Doppler detection system 403 includes a housing 405 mounted on a surface 407 within the cockpit 400. The housing 405 includes a display 409 which emits a visible alert signal 411 which can be monitored by the pilots within the cockpit 400. The display 409 may be accompanied by one or more speakers 413 and intercom interface positioned on the housing 405 or elsewhere within the cockpit 400 to emit an audible alert corresponding to the visible alert signal 411 emitted by the display 409.

One skilled in the arts will readily understand that while the housing 405 is shown mounted to the glare shield within the cockpit, the housing 405 and device components may be positioned anywhere within the pilot's field-of-view including being incorporated as a component on the instrument cluster, or as a component of a heads-up-display, etc.

In some embodiments, the audible tone, voice message, and/or other alert signal is transmitted concurrently with one or more visual warnings. The visual warnings may be displayed within the cockpit of the aircraft. Further, the visual warnings may be displayed on the Doppler detection device in the case where the Doppler detection device is in the field-of-view of the pilot. Audible warnings may be presented concurrently via speakers and via the aircraft intercom system.

In some embodiments, the pilot may have the ability to select the intensity, volume, frequency, etc. of the audible and visual alerts. Further, the pilot may have the ability to turn off the alerts, instruct the system to ignore the alerts, and the like. The ability to turn off the alerts or ignore the alerts may be advantageous in cluttered environments, such a helicopter pilot landing or performing a hoist in an area surrounded by trees, buildings, electrical cables, etc.

In some embodiments, the Doppler detection device may have a limited output power to ensure aircrew safety from reflected energy within the cockpit, or from a rotor or propeller which will limit the maximum effective range of the device's detection capabilities. In some examples, the maximum effective range may be about 3000 feet. It is known that aircraft speed is a factor in the warning time available for a pilot. In such, the device may be modified to be designed for its specific application in various forms of aircraft. For example, some embodiments of the Doppler detection device may be best-suited for rotorcraft and light aircraft which have a cruising speed of 175-knots or less. For a target detected at a range of 2000-feet, a helicopter having a cruising speed of 120-knots would have about 10-seconds of warning between when the imminent threat is recognized by the system and impact occurs with the imminent threat. In another example, a light aircraft traveling at 170-knots would have about 7-seconds of warning between when the imminent threat is recognized by the system and impact with the imminent threat occurs. In such, the pilot may only need to make a simple level turn of about 10-degrees to avoid the threat.

In some embodiments, the transmitted alert may increase in volume, frequency, intensity, etc. to indicate a range of the threat. For example, the audible tone may increase in volume as aircraft moves closer to the threat and the reflected signal grows stronger.

In some embodiments, the device may be constructed and configured in a way which is best-suited for commercial jet aircraft which are limited to a 250-knot speed on arrival when the aircraft is below 10,000-feet (as is required in United States airspace). By mounting the device outside of the cockpit, output power may be increased to detect a typical target at a range of 4,300-feet or more, providing 10-seconds or more of warning to the commercial jet aircraft at 250 knots. The system output power may be automatically increased as a function of higher airspeeds when the aircraft is on departure to provide a minimum warning time from detection to potential impact. (10-seconds used as an example here).

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible e.g., parasitic intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A counter-bird aircraft system, comprising:

a Doppler detection device including at least one emitter positioned on an aircraft, the emitter to emit a continuous beam of radio-frequency energy in a fixed pattern ahead of the aircraft, wherein during normal flight conditions no return signal of the emitted continuous beam is received by the system;

at least one receiver to detect a return signal of the emitted continuous beam reflected from a threat to the aircraft;

a microprocessor to process the reception of the return signal and transmit an alert to an alert system, the alert to notify the pilot of the threat; and wherein the alert is transmitted for as long as the return signal is detected by the at least one receiver, and wherein the system intentionally provides no speed information of the threat, no range information of the threat, and no information about a target type of the threat to the pilot.

2. The counter-bird aircraft system of claim 1, wherein the at least one emitter and the at least one receiver are positioned on an internal or external forward-facing portion of the aircraft to emit the beam in the forward direction corresponding to the direction the aircraft is moving.

3. The counter-bird aircraft system of claim 1, wherein the alert system includes at least one audio system interface to emit an audible tone within the cockpit of the aircraft.

4. The counter-bird aircraft system of claim 3, wherein the at least one audio system interface emits a recorded voice message within the cockpit of the aircraft.

5. The counter-bird aircraft system of claim 1, wherein the alert system further comprises one or more lights positioned in the cockpit of the aircraft, the one or more lights to function as a visible alert.

6. The counter-bird aircraft system of claim 1, further comprising one or more counter-bird lights positioned on the exterior of the aircraft, wherein the Doppler detection device is employed to activate the exterior counter-bird lights.

7. The counter-bird aircraft system of claim 1, further comprising a computer system in communication with the Doppler detection system, the computer system to receive the return signal received by the receiver, and to process the return signal to determine if the return signal signifies the threat to the aircraft.

8. The counter-bird aircraft system of claim 7, wherein the microprocessor is in operable communication with the computer system, wherein the microprocessor is used to estimate a distance between the aircraft and the threat.

9. The counter-bird aircraft system of claim 8, wherein magnitude of the reflected energy from the threat is used to adjust the intensity of the alert, wherein the intensity of the alert corresponds, in real-time, to the proximity between the aircraft and the threat.

10. The counter-bird aircraft system of claim 1, further comprising a controller to enable the pilot to turn off or ignore the alert.

11. The counter-bird aircraft system of claim 1, wherein the beam is emitted in a direction to account for variability in the pitch of the aircraft.

12. The counter-bird aircraft system of claim 1, wherein the microprocessor is in operable communication with the aircraft computer system, wherein the microprocessor is used to vary an output power and receiver sensitivity of the system based on aircraft airspeed to provide a minimum warning time from initial detection of the threat to estimated impact with the threat.

* * * * *